United States Patent
Franz et al.

[15] 3,667,309
[45] June 6, 1972

[54] MULTI SPEED DRIVE TRANSMISSION

[72] Inventors: Maurice F. Franz, East Peoria; Charles H. Herr, Peoria; Harry B. Newman, Washington; Philip S. Webber, Morton, all of Ill.

[73] Assignee: Caterpillar Tractor Co., Peoria, Ill.

[22] Filed: Oct. 14, 1970

[21] Appl. No.: 80,716

[52] U.S. Cl. ...............................74/340, 192/4 A, 192/18 A, 192/85 CA
[51] Int. Cl. .................................B60k 29/00, B60k 21/00
[58] Field of Search...................192/18 A, 85 CA, 4 A, 4 C; 74/340

[56] References Cited

UNITED STATES PATENTS

| | | | |
|---|---|---|---|
| 1,739,946 | 12/1929 | Cahart | 74/340 X |
| 2,653,690 | 9/1953 | Saracchi | 192/4 A |
| 3,157,257 | 11/1964 | Root | 192/18 A |
| 3,508,450 | 4/1970 | Richards | 74/340 |

*Primary Examiner*—Benjamin W. Wyche
*Attorney*—Fryer, Tjensvold, Feix, Phillips & Lempio

[57] ABSTRACT

A drive transmission for powered vehicles and the like has change speed gears which may be shifted to provide a selected one of a plurality of drive ratios and has clutches at both the input and output ends whereby the gears may be decoupled from both the driving engine and driven shaft and may then be braked to a stop to facilitate shifting. Brakes are provided at both the input and output ends of the gearing section and a pneumatic control system responds to movement of the operator's shift lever by operating the clutches and brakes in a programmed sequence which assures smooth shifting and avoids damage. Upon movement of the operator's shift lever to a selected setting, the control system simultaneously disengages both clutches and applies both brakes. The control system then energizes fluid operated means for making the appropriate gear interconnections and then sequentially releases the input brake and the output brake. The input clutch is then engaged and finally the output clutch is engaged to reestablish a driving connection between the engine and driven elements. The delay between release of the input and output brakes assures that abutted teeth in the gearing section engage easily at low relative speeds and under only light loading.

12 Claims, 8 Drawing Figures

Fig-3.

| SPEED RATIO | PRESSURIZED CONTROL LINES | | | | | |
|---|---|---|---|---|---|---|
| | 93a | 93b | 93d | 93c | 93f | 93e |
| 16 | | | | | | |
| 15 | | | X | | | |
| 14 | X | | | | | |
| 13 | X | | X | | | |
| 12 | | X | | | | |
| 11 | | X | X | | | |
| 10 | X | X | | | | |
| 9 | X | X | X | | | |
| 8 | | | | X | | |
| 7 | | | X | X | | |
| 6 | X | | | X | | |
| 5 | X | | X | X | | |
| 4 | | X | | X | | |
| 3 | | X | X | X | | |
| 2 | X | X | | X | | |
| 1 | X | X | X | X | | |
| N | X | | X | X | X | |
| R$_1$ | X | | X | X | | X |
| R$_2$ | | | X | X | | X |

INVENTORS
MAURICE F. FRANZ
CHARLES H. HERR
HARRY B. NEWMAN
PHILIP S. WEBBER

3,667,309

MULTI SPEED DRIVE TRANSMISSION

BACKGROUND OF THE INVENTION

This invention relates to transmissions for providing any selected one of a plurality of drive ratios between the engine and driven means of a powered vehicle or the like and more particularly, to mechanical transmissions of the form having a plurality of change speed gears with means for shifting interconnections between the gears to provide a selected drive ratio.

Drive transmissions for vehicles and the like may be broadly divided into two types each having certain advantages and disadvantages relative to the other. A first type includes automatic or semi-automatic transmissions employing hydrodynamic drive elements, planetary gearings or combinations thereof. Transmissions of this kind are usually shifted by fluid powered means either fully automatically or in response to a simple movement of a control lever by the operator. Such transmissions exhibit a highly efficient shift performance and are relatively less dependent on operator skill and judgement. The second class of transmissions, commonly referred to as standard transmissions, employ a set of ratio gears which have generally been shifted manually by the operator's manipulation of a control lever and which require operator manipulation of a clutch in conjunction with the shift lever. These standard transmissions are less efficient from the power utilization standpoint during a shift and are much more demanding of the operator in both effort and skill. The standard transmission does have the advantages of less bulk, complexity and cost and more efficient torque transmission aside from the shift transient periods.

U. S. Pat. No. 3,508,450 describes a hybrid form of transmission which combines certain advantages of the two types discussed above. The transmission of the above identified patent is basically of the form having a set of change speed gears but, in contrast to the commonly used standard transmission, a clutch is provided at both the input and output end of the gearing section whereby the gears may be decoupled from both the driving engine and driven load and braked to a stop to facilitate shifting. A pneumatic control system responds to movement of an operator's shift lever by automatically initiating and controlling the necessary clutch disengagements, braking, gear shifting, brake release and clutch re-engagements to perform the shift. A preferred control system of this kind is described in copending application Ser. No. 801,405 of Maurice F. Franz, et al. filed Feb. 24, 1969 for Pneumatic Shift Control for a Mechanical Transmission and assigned to the assignee of this application. A transmission of this kind combines the basic efficiency of standard transmissions with the superior shifting performance of automatic or semi-automatic types. A prominent advantage of the form of transmission described in U. S. Pat. No. 3,508,450, in addition to ease of control, is that engagements within the gearing section can be accomplished without bulky synchronizers and it is practical to utilize all possible power paths through a given set of gears to provide for a maximum number of possible drive ratios.

In such a system it is possible that at the time particular gears, shift collars or the like are urged towards engagement, abutting of teeth may occur which momentarily prevents the desired engagement. This problem is met in the apparatus described in the above identified patent by releasing the brake prior to full engagement of the input and output clutches and by transmitting a relatively light torque to the gearing so that any abutted tooth elements turn relatively slowly and under light loading so that the necessary annular relationship for engagement is reached prior to reestablishment of drive through the transmission. As heretofore designed, structural complications and extremely precise control of clutch and brake operations have been necessary in this form of transmission to realize assured, rapid and damage free engagement of abutted gear teeth in the course of the shift transient. During the period that light torque is being transmitted to the gears to engage abutted teeth, the toothed element nearest the drive input may tend to turn the abutted tooth element rather than undergoing relative rotation to realize the desired engagement. It has also been thought that otherwise desirable forms of clutch could not be utilized at the output. An output clutch of the disc type, for example, may tend to transmit some drive due to viscous drag and this could delay the desired engagement of the abutted tooth elements. Still other phenomena can occur under certain conditions which delays the desired shifting of gears or which produces a raking engagement that accelerates wear and the possibility of tooth breakage.

SUMMARY OF THE INVENTION

This invention is a multi-speed drive transmission of the form having change speed gearing with clutches at both the input and output ends thereof whereby the gears may be braked to a stop to facilitate shifting and which has fluid operated shift means to perform all necessary control functions in response to a simple movement of the operator's control lever into a selected position. The invention provides a construction for transmission of this type in which the engagement of abutted tooth elements is accomplished very rapidly and reliably with reduced risk of wear and damage. As hereafter set forth in more detail, a brake is employed at the output end of the change speed gearing in addition to the brake at the input end thereof and control means sequence the operation of the input and output clutches and brakes to optimize shifting performance. Most notably, the control means releases one brake prior to release of the other brake and prior to full engagement of the clutches whereby a slow relative motion between abutted tooth elements in the gearing section is assured to provide the desired engagements rapidly and without excessive wear or risk of damage. Further, the brake at the output enables use of a compact and efficient disc clutch at the transmission output in a preferred form of the invention.

Accordingly, it is an object of this invention to provide a multi-speed drive transmission of the form employing a set of change speed gears which are stopped in the course of a shift transient to facilitate shifting the transmission having means which more reliably assures rapid and damage free engagement of gears in the course of a shift.

It is another object of the invention to provide output means for a transmission of the form described embodying compact and efficient disc clutch and brake means.

The invention together with further objects and advantages thereof will best be understood by reference to the following description of a preferred embodiment and by reference to the accompanying drawings.

BRIEF DESCRIPTION OF THE DRAWINGS

In the accompanying drawings:

FIGS. 5A, 5B, and 5C jointly constituting a single diagram wherein the figures may be juxtaposed in the arrangement depicted in outline form in FIG. 6 to facilitate examination thereof.

DESCRIPTION OF A PREFERRED EMBODIMENT

Figure 1:
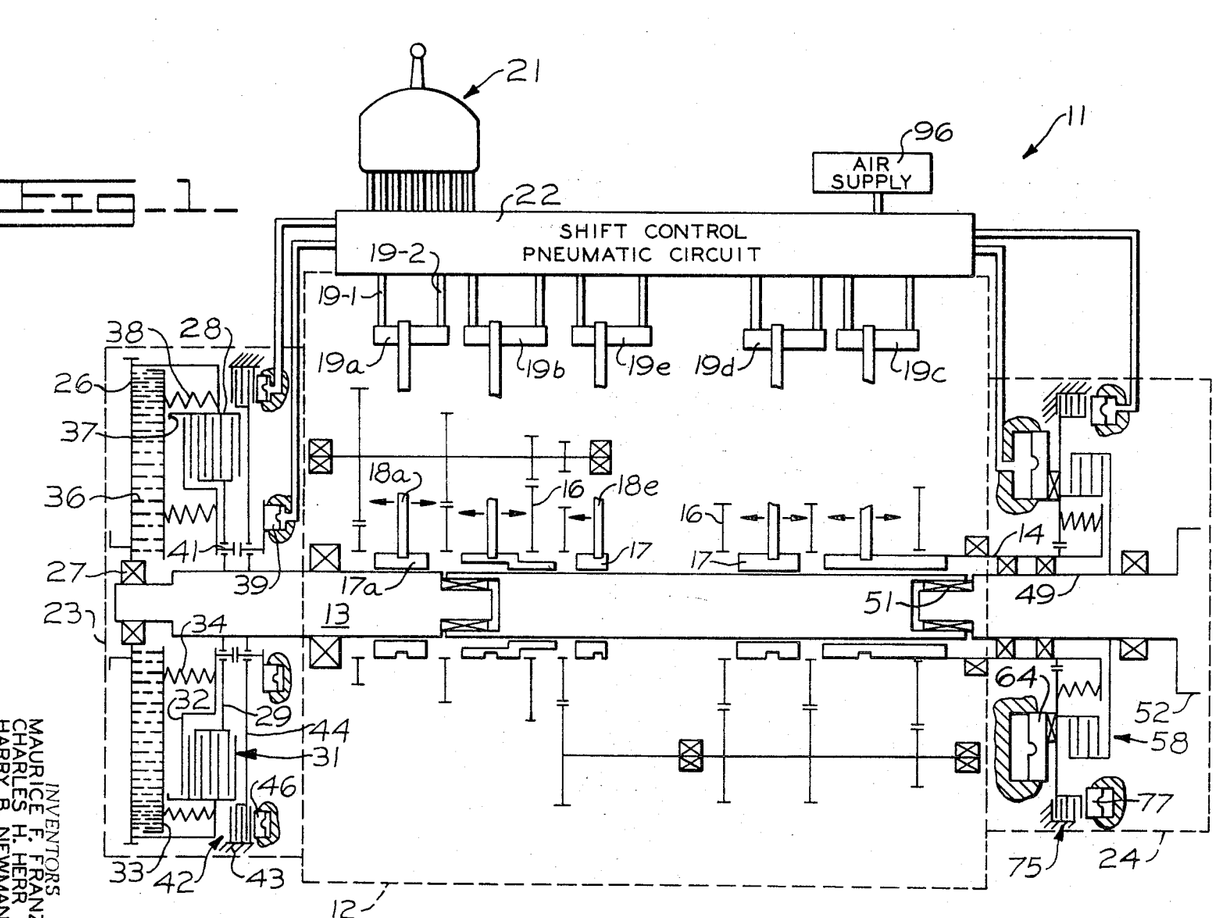
FIG. 1 is a schematic diagram of a vehicle transmission embodying the invention.
Figure 3:
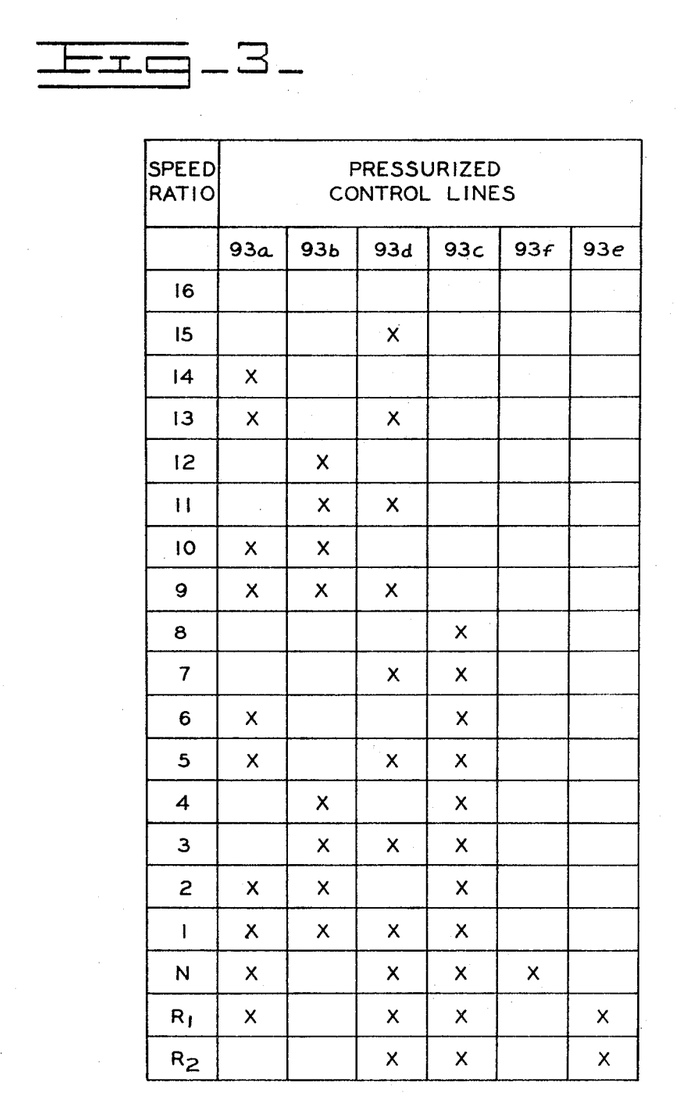
FIG. 3 is a chart showing the various combinations of fluid pressure operated shift fork actuators of FIG. 1 which are energized to realize a selected one of 16 forward drive ratios, neutral or two reverse drive ratios.

Referring initially to FIG. 1 of the drawing, a transmission 11 in accordance with the invention may include a change speed gear section 12 of the known form described in U. S. Pat. No. 3,508,450. Such a gear section has an input shaft 13 extending from the front end and an output shaft 14 extending from the back end and includes a plurality of change speed ratio gears 16 which may be interconnected in different patterns by shifting a series of clutch collars 17 to provide any of a predetermined plurality of drive ratios between the input and output shafts. In the particular gearing section illustrated in FIG. 1, 16 forward speeds, neutral and two reverse speeds may be realized by shifting appropriate combinations of five clutch collars 17a to 17e, suitable detailed mechanical structure for such a change speed gear section 12 being described in the above identified patent. Each shift collar 17a to 17e is manipulated by an associated shift fork 18a to 18e respectively which is in turn operated by an associated individual one of five air pressure controlled actuator cylinders 19a to 19e respectively. The actuators 19 may be essentially of the form described in detail in copending application Ser. No. 887,803 of Charles H. Herr for Shift Fork Mechanism for Drive Transmissions filed Dec. 15, 1969 and assigned to the assignee of the present application. Actuators of this form have two air pressure ports 19–1 and 19–2 and if pressurized air is supplied to port 19–1 while venting port 19–2 the associated fork 18 and clutch collar 17 is moved in a first axial direction while pressurizing of port 19–2 and venting of port 19–1 shifts the fork and clutch collar in the opposite direction. FIG. 3 illustrates the particular ports of actuators 19a to 19e which are pressurized to realize the 16 forward speeds, neutral and two reverse speeds provided in this specific gear section 12, it being apparent that the invention is applicable to transmissions having different arrangements of change speed gears 16 and different numbers of shift means actuators 19 for providing different numbers of speed ranges.

Referring again to FIG. 1, appropriate ones of the actuators 19 are energized to establish a selected speed ratio, in response to movement of an operator's shift initiating lever 21, by a pneumatic shift control circuit 22 which will be hereinafter described in detail.

As is evident from an examination of FIG. 1 in conjunction with FIG. 3, a change of drive ratio in the gearing section 12 requires that one or more of the toothed clutch collars 17 be disengaged from a toothed ratio gear 16 and that one or more of the shift collars be engaged with others of the ratio gears. Further, no bulky conventional synchronizer means are present to facilitate these operations. This is made possible in a transmission of this form in that both the gearing section input shaft 13 and output shaft 14 are decoupled from the driving engine and driven load respectively at the beginning of the shift transient and the gears 16 are braked to a stop or near stationary condition before being shifted. Following operation of the shift actuators 19, the input shaft 13 and output shaft 14 are recoupled to the driving engine and driven load respectively to reestablish drive through the transmission. An input coupler section 23 performs the decoupling, braking and recoupling functions at input shaft 13 in response to pressure signals from control circuit 22 and an output coupler section 24 performs the similar functions at output shaft 14 also in response to pressure signals from the control circuit.

A suitable detailed mechanical construction for the input coupler section 23 is described in copending application Ser. No. 30,680 of Elmer A. Richards for Self Modulated Input Clutch for Vehicle Drive Transmissions, filed Apr. 22, 1970 and assigned to the assignee of the present application. As therein set forth in greater detail, such an input coupler section 23 may include a flywheel 26 disposed coaxially with respect to gear section input shaft 13 and journalled for rotation thereon by a suitable bearing 27, the flywheel being adapted for connection to the driving engine of the associated vehicle or the like. Flywheel 26 carries a sleeve section 28 and within the sleeve section an annular hub 29 is disposed coaxially on input shaft 13 for rotation therewith. A disc input clutch 31 provides for engagement or disengagement of the flywheel 26 with hub 29, alternate ones of the clutch discs being splined to the flywheel sleeve section 28 and the intervening ones of the clutch disc being splined to the hub.

Input clutch 31 is engaged and disengaged by axial movement of an annular pressure plate 32. To exert a force on the pressure plate 32 tending to engage input clutch 31, a piston plate 33 is disposed coaxially around input shaft 13 and is movable relative thereto in an axial direction. A series of compression springs 34 act between piston 33 and pressure plate 32 to urge the pressure plate in a direction tending to engage the input clutch 31. Smooth shifting of a transmission of this general form requires a modulated engagement of the input clutch 31 at the conclusion of a shift transient to avoid severe torque mismatches. In the more common form of mechanical transmission, this clutch modulation requires careful manipulation of a clutch pedal on the part of the operator. In the transmission 11, the desired input clutch modulation is realized automatically by providing a volume of oil 36 between flywheel 26 and piston 33, the oil being trapped therebetween by centrifugal effects which tend to urge the liquid radially outward with respect to the axis of rotation of the flywheel and piston. Under this condition the oil volume 36 exerts an axial pressure against piston 33 which is a function of the angular velocity of the oil volume and which is thus a function of engine speed. Accordingly, the force which piston 33 exerts on input clutch pressure plate 32 through springs 34 is modulated as a function of the speed of the driving engine to produce the desired gradual input clutch engagement at the conclusion of a shift transient. The optimum variation of clutch engagement pressure with engine speed varies according to such factors as the form of driving engine which is used, the nature of the driven load, input clutch capacity and the like. The present example of the invention was designed for use in a highway truck having a diesel engine wherein the modulation of clutch capacity is preferably confined to the lower range of engine speeds and should be held substantially constant as higher engine speeds are reached. Accordingly, movement of piston 33 in response to increasing pressure in oil volume 36 is limited at a predetermined point by contact of the piston plate with a stop 37 carried by a sleeve section 28 of flywheel 26. Once the engine speed increases to the point where piston plate 33 contacts stop 37, the engagement pressure on input clutch 31 is thereafter determined solely by the force of springs 34 and is therefore relatively constant.

In order to shift the piston plate 33 in a direction which relieves the engagement pressure on input clutch 31 when the engine speed drops to idling speeds or below, a series of disengagement springs 38 act between the sleeve section 28 of the flywheel and the pressure plate in opposition to the centrifugally generated force of oil volume 36 thereon. Thus at low idling speeds input clutch 31 is effectively disengaged as springs 38 relieve the force of pressure plate 32 on the clutch. As engine speed increases the centrifugally generated force of oil volume 36 overcomes the force of springs 38 and shifts piston plate 33 in a direction which tends to engage the input clutch 31 and the rate of engagement is modulated as a function of engine speed up to a predetermined point after which the clutch capacity is held essentially constant. No operator manipulation of a clutch pedal or the like is required for this purpose. The transmission gear section input shaft 13 is automatically decoupled from the driving engine at any time when engine speed drops below a predetermined point and is automatically recoupled as engine speed increases except during forced disengagement in connection with a shift.

To accomplish a shift of a transmission 11, it is necessary that the input clutch 31 be temporarily forced to a disengaged condition without regard to engine speed. For this purpose the input coupler section 23 includes a front clutch piston 39 which may be shifted by a fluid pressure signal from control circuit 22 and which then bears against clutch pressure plate 32, through a series of pins 41 to force disengagement of the clutch. Release of pressure from behind piston 39 enables the clutch to reengage and the reengagement may be modulated as described above if engine speed has been reduced.

Following disengagement of input clutch 31 in preparation for a shift, it is necessary that the ratio gears 16 be brought to a stop or near stationary condition. This is accomplished in part by an input brake 42 located in input coupler section 23. Brake 42 has alternate discs splined to the housing 43 of the transmission with the intervening discs being splined to an annular hub 44 coupled to gear section input shaft 13 for rotation therewith. A front brake piston 46 is responsive to fluid pressure from control circuit 22 to compress the disc brake assembly 46 and thereby stops rotation of the gear section input shaft 13.

The output coupler section 24 of this transmission 11 differs significantly from that described in U. S. Pat. No. 3,508,450 and accordingly reference should be made to FIG. 2 in conjunction with FIG. 1, FIG. 2 illustrating a suitable detailed mechanical construction for the coupler section 24.

Figure 2:
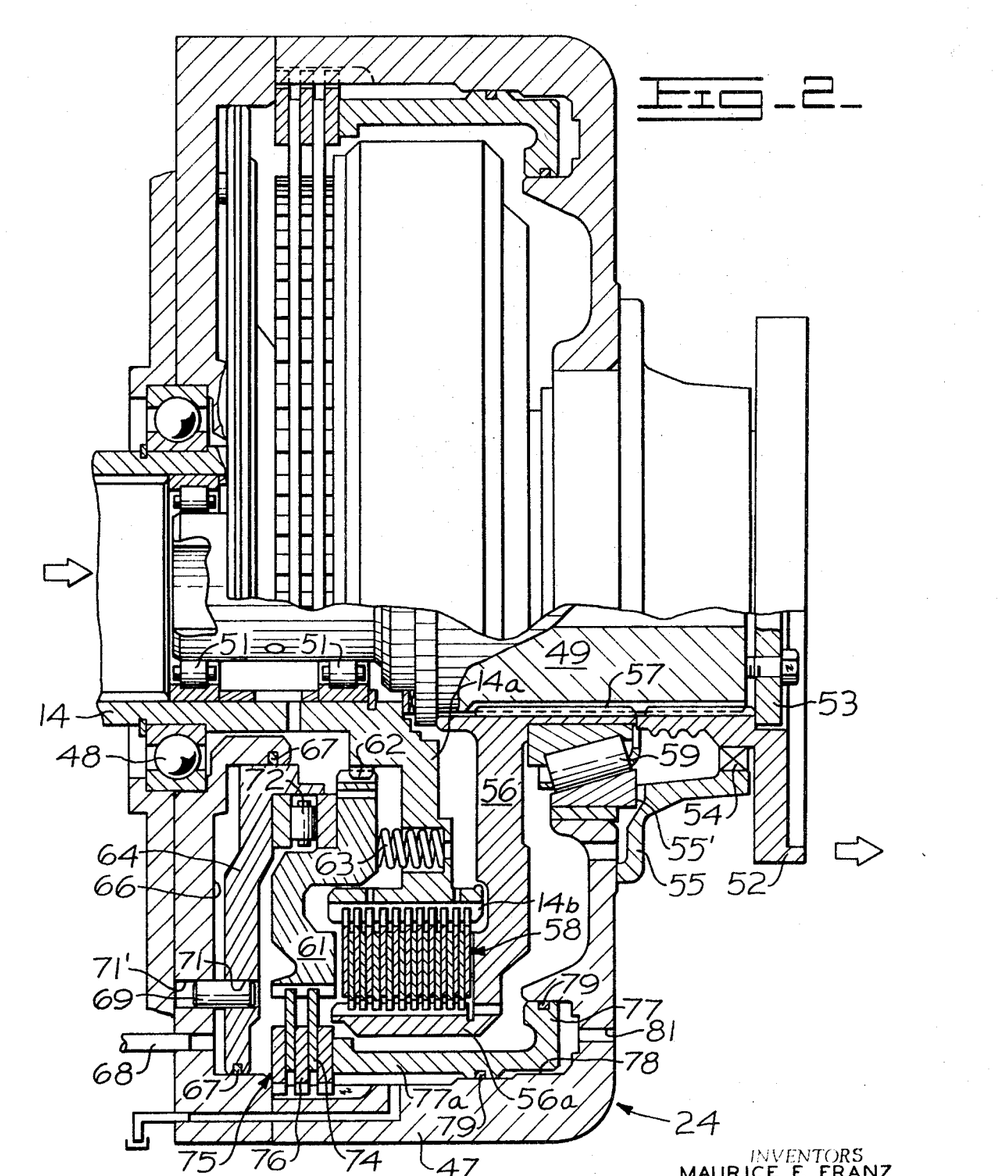
FIG. 2 is a broken out side view of an output coupler section including a clutch and brake assembly of the transmission of FIG. 1 illustrating a suitably detailed mechanical construction for the assembly.

As shown in FIG. 2, the output shaft 14 of the gearing section extends into an annular housing 47 of the output coupler section and is journalled in the forward wall thereof by a suitable bearing 48. Within housing 47, gear section output shaft 14 has a flange portion 14a connecting with a sleeve portion 14b. A driven shaft 49 is disposed along the axis of shaft 14 and has a front end of reduced diameter which is journalled in the back end of shaft 14 by suitable bearings 51. Driven shaft 49 extends through the rear wall of housing 47 and a transmission output flange 52 is splined onto shaft 49 and held thereon by an end plate 53 bolted to the shaft 49. Output flange 52 may be coupled to the wheel drive line of the vehicle or another rotary load which is to be driven through the transmission. Driven flange 52 is supported for rotation by an annular bearing retainer housing 55 at the back of housing 47. A lubricating oil seal 54 is disposed between housing 55 and flange 52.

Under engaged conditions, drive is transmitted from the gearing section output shaft 14 to driven shaft 49 through an annular hub 56 disposed coaxially on shaft 49 and coupled thereto by splines 57. Hub 56 has a sleeve portion 56a which is coaxial with respect to sleeve portion 14b of shaft 14 and spaced radially outward therefrom. An output clutch disc pack 58 is carried between sleeves 14b and 56a with alternate discs being splined to sleeve 14b and the intervening disc being splined to sleeve 56a. Accordingly drive is transmitted from gearing section output shaft 14 to driven shaft 49 if the clutch pack 58 is compressed axially while the driving connection between the two elements is interrupted if the pressure on the clutch pack is released. As heavy torque loads may require substantial axial pressure on clutch pack, a large tapered roller bearing 59 of the thrust form is disposed between hub 56 and a shoulder 55' formed on housing 55.

Pressure needed to engage the output clutch 58 is provided by an annular axially movable pressure plate 61 disposed coaxially within housing 47 forwardly from flange 14a and in position to exert pressure against clutch pack 58 when the pressure plate is forced in the direction of flange 14a.

To assure rotation of the pressure plate 61 with shaft 14, a spline engagement 62 is provided therebetween. Pressure plate 61 is biased towards the position at which clutch 58 disengages by a series of compression springs 63 disposed between the pressure plate and flange 14a. Thus in order to transmit drive through the output coupler section 24 it is necessary that the force of springs 63 be overcome. The force necessary for this purpose is provided by an axially movable output clutch piston 64 disposed in an annular chamber 66 at the front end of housing 47, seals 67 being provided at the radially intermost and outermost ends of the piston whereby the pressure within chamber 66 may be controllably increased by admission of air through a control conduit 68 to urge the piston in the direction of pressure plate 61.

To decrease wear and reduce power loss, piston 64 is locked against rotary motion by a series of dowels 69 which extend into conforming bores 71 and 71' in the piston and housing 47 respectively. To transmit axial movement of piston 64 to pressure plate 61 while the pressure plate rotates and the piston is held against rotation, a roller thrust bearing 72 is disposed therebetween.

Accordingly, gearing section output shaft 14 may be caused to transmit drive to output flange 52 by application of air under pressure to chamber 66 through conduit 68 thereby urging piston 64 to move pressure plate 61 against the force of disengagement springs 63 to exert a clamping force on clutch 58. By appropriate control of the air pressure in chamber 66 a modulated engagement can be effected to avoid shock loads and the timing of engagement and the effective clutch capacity can be regulated as desired for optimum performance.

The present invention differs from prior transmissions of this general type by utilizing braking means in the output coupling section in addition to the braking means of the input coupler and by operating the two braking means sequentially in the course of a shift transient. To provide the output braking function, axially spaced annular friction disc plates 74 are splined to the radially outermost surface of pressure plate 61 and are alternated with annular reaction members 76 which are splined to the innersurface of housing 47. An annular output brake piston 77 is slidable within a groove 78 formed in housing 47 and carries seals 79 whereby the piston may be advanced to apply pressure to brake elements 74 and 76 by the controlled admission of air into groove 78 through a conduit 81. Piston 77 has a sleeve extension 77a which extends toward the most adjacent brake disc 76 so that motion of the piston in response to increasing air pressure in groove 78 acts to compress brake elements 74 and 76 to stop rotary motion of pressure plate 61. This in turn stops rotation of the gearing section output shaft 14 and all ratio gears coupled thereto.

Referring now again to FIG. 1, movement of the operator's shift lever 21 out of one particular speed setting and into another causes shift control circuit 22 to sequence operation of the several clutches and brakes and shift actuators described above to effect the selected shift. For rapid reliable and damage free shifting, the control circuit 22 first disengages both input clutch 31 and output clutch 58. These clutch disengagements may be simultaneous or nearly simultaneous. Following the clutch disengagements, both the input brake 42 and output brake 75 are engaged to bring all rotating elements of the gearing section 12 to a stationary or near stationary condition. The brake engagements may also be simultaneous or nearly so. As the brakes engage, shift control circuit 22 applies pressurized air to appropriate ports of the shift collar actuators 19 while venting others thereof to perform the particular shift represented by the movement of control lever 21. Thus when the rotary elements of gearing section 12 are stopped or nearly stopped appropriate disengagements and engagements of clutch collars 17 occur to condition the gearing section for the newly selected drive ratio. The necessary engagement of clutch collars 17 with associated ratio gears 16 may not occur at this time if a condition of tooth abutment is present. Where teeth are abutting, the clutch collar 17 does not engage with the adjacent ratio gear but is urged thereagainst as the associated actuator attempts to make the engagement. The control circuit 22 then releases the front brake 42 only. At this time a small amount of torque is transmitted from flywheel 26 to gearing section input shaft 13 as a disc clutch such as input clutch 31 tends to transmit a certain amount of torque even in the disengaged condition, because of viscous drag, friction and other effects, provided that the output is not braked or heavily loaded. This relatively slow rotation of the gearing section input shaft 13 tends to cause relative rotation between toothed elements in the gearing section which may be abutted thereby completing the desired engagement.

A predetermined time after the front brake 46 has been released, which is sufficient to reliably assure that all abutted tooth elements in the gearing section 12 will have engaged, the output coupler brake 75 is then also disengaged. The control circuit 22 then relieves the pressure behind input coupler clutch piston 39 to enable the input coupler to begin the self-modulated input clutch engagement process described above. The control circuit 22 then applies air pressure to piston 64 of the output coupler section 24 to reengage output clutch 58 thereby restoring drive through the transmission to connect the associated engine and driven load at the new speed ratio.

Figure 4:
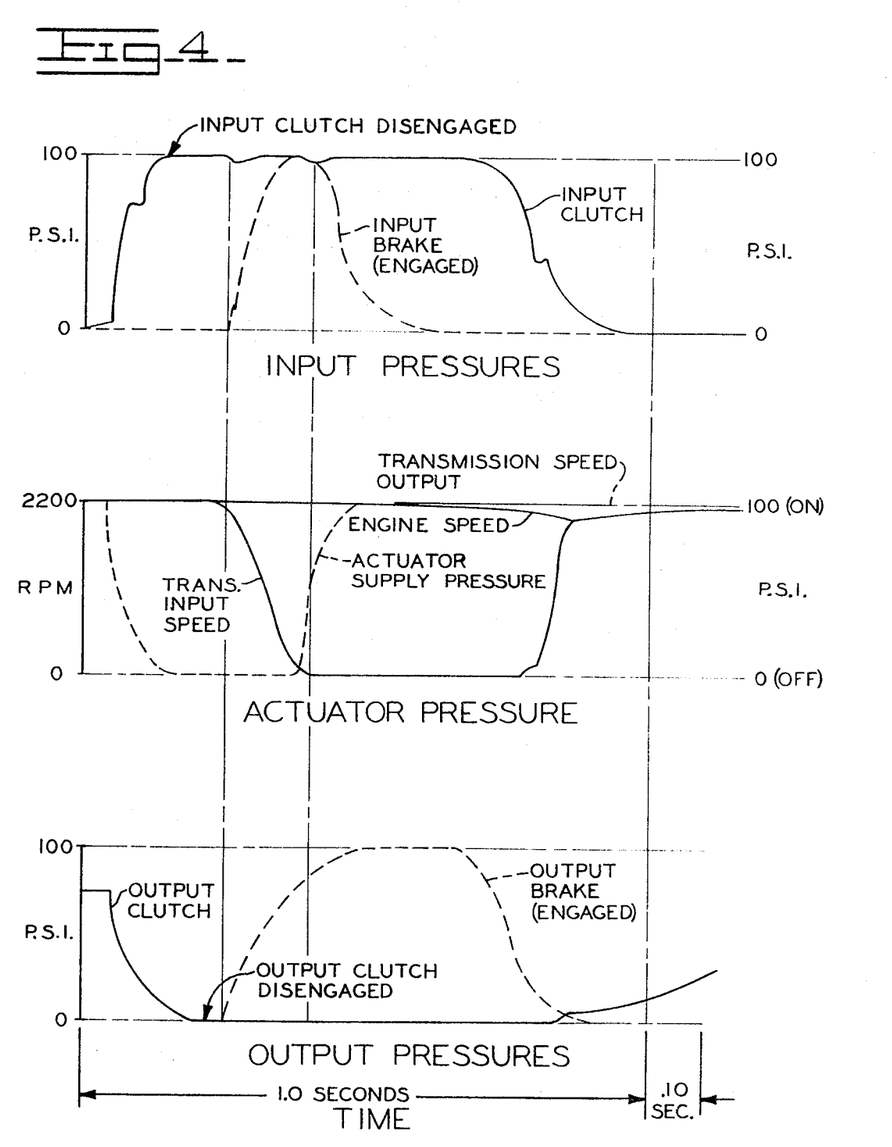
FIG. 4 is a graphical illustration of fluid pressures as a function of time at certain fluid pressure actuated elements of the transmission of FIG. 1, and FIGS. 5A, 5B, and 5C diagrammatically illustrate the operator's shift control lever and pneumatic circuit elements which respond to movement of the shift lever to operate elements of the transmission of FIG. 1 for the purpose of effecting a selected shift, the circuit being shown in the condition which exists in the absence of air supply pressure.

In practice, the engagement and disengagement of the clutches and brakes is not an abrupt process but occurs gradually so that initiation of the several operational functions for a shift described above overlap. FIG. 4 illustrates the relative timing of engagement and disengagement of the input and output clutch brakes and energization of the shift actuators as a function of time for one example of the invention wherein the entire shift transient occurs in approximately 1 second following movement of the operator's control lever and the maximum supply pressure applied to the actuator piston of the clutches and brakes is 100 lbs. per square inch. FIG. 4 also includes a graph of typical engine speed changes in the course of the shift transient for a vehicle wherein maximum governed engine speed is 2,200 revolutions per minute. Normally, the operator removes his foot from the vehicle accelerator pedal in the course of a shift and thus a deacceleration and reacceleration of the input to the transmission occurs.

Thus, the functions of the control circuit 22 in response to movement of the operator's shift control lever 21 are reduced to a matter of applying and releasing air pressure at the input and output clutches 31 and 58 respectively, input and output brakes 42 and 75 respectively and shift means actuators 19 according to a predetermined sequenching. Considering now a suitable pneumatic circuit 22 for this purpose, with reference to FIG. 5a in particular, the operator's control lever 21 may be pivoted to a suitable support 82 for fore and aft movement along an arc 83 to any of 19 distinct positions, in this example, each position corresponding to one of the 16 forward speeds, neutral, or one of the two reverse speeds. Lever 21 is also provided with an articulation 84 enabling the control knob 86 which is grasped by the operator to be moved a relatively small distance to one side of arc 83 at any of the 19 fore and aft positions. To define the permissible movement of the control lever 21, the lever may project through a slot 87 in a shift quandrant plate 88 wherein short notches 89 define the small sideward movements of the shift lever at any of the fore and aft positions.

Figures 5A, 6:
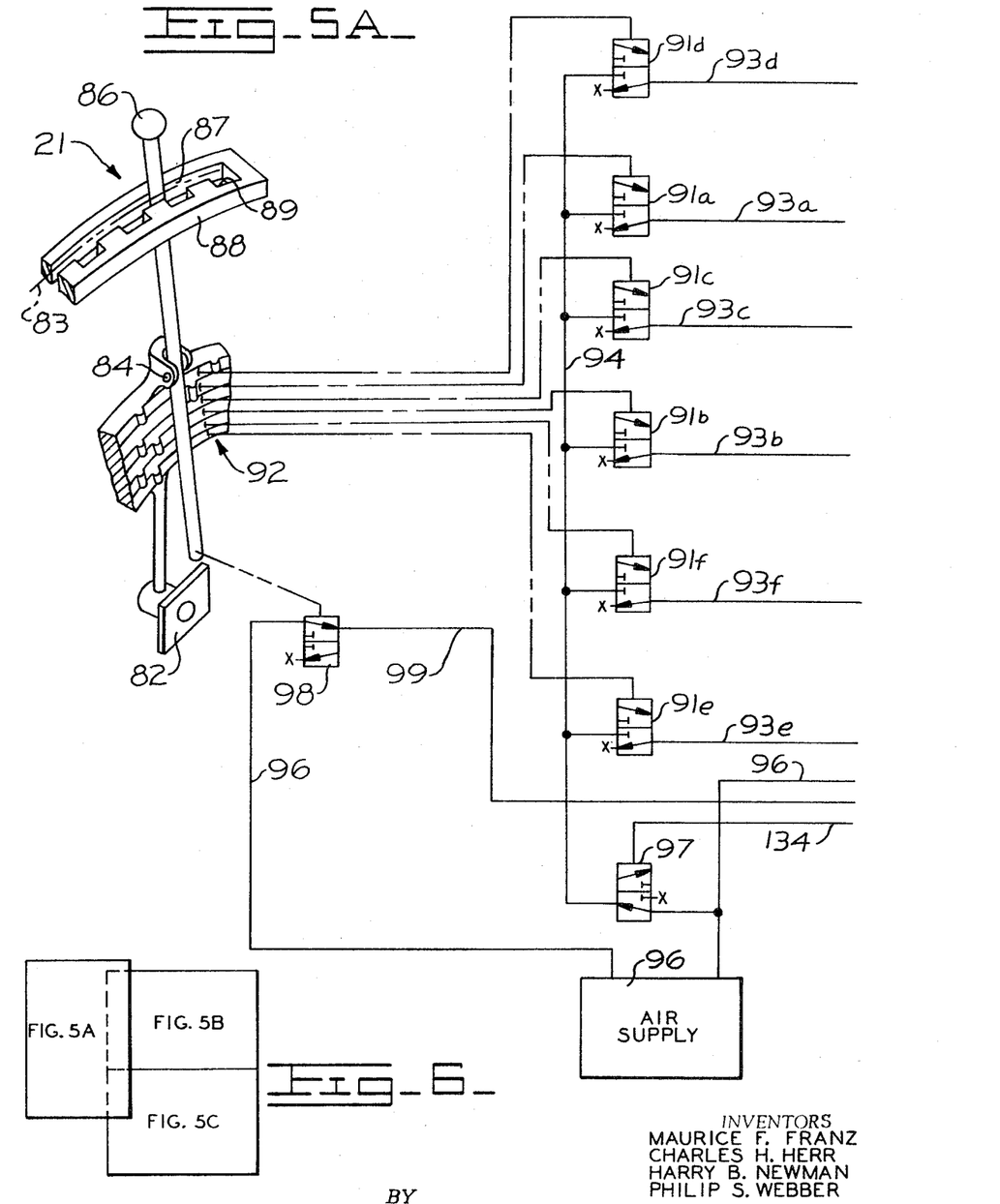
Figure 5B:
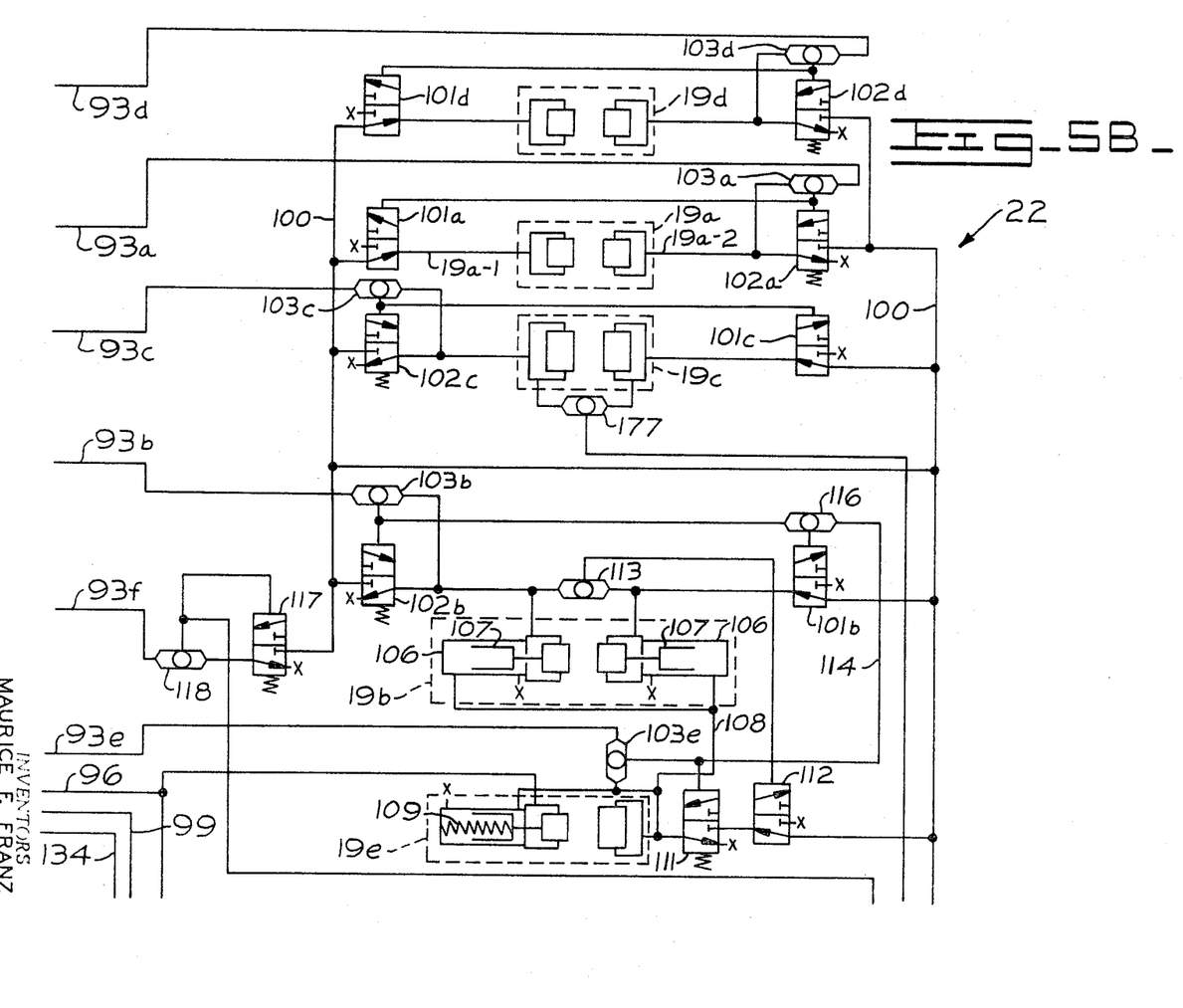
Figure 5C:
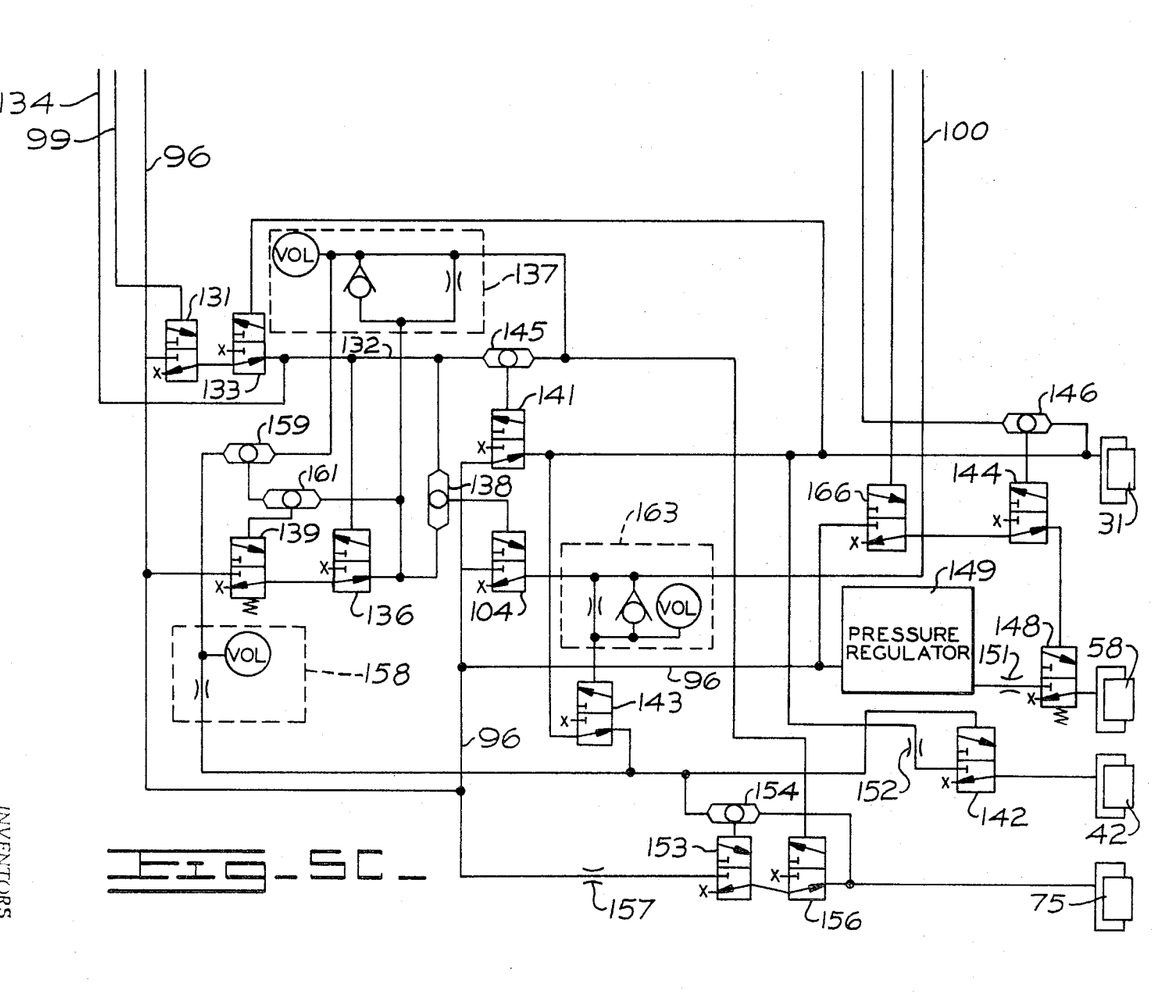

At any of the positions of control lever 21 along arc 83 the control lever operates a unique combination of predetermined ones of six pilot valves 91a to 91f. Pilot valves 91a to 91e are associated with the corresponding ones of shift fork actuators 19a to 19e as will hereinafter be described in more detail and the additional pilot valve 91f provides for a neutral condition in the transmission as will also be described.

To provide for piloting of the predetermined combination of pilot valves 91 at each position of the lever along arc 83, cam means 92 are positioned along the path of the lever to mechanically shift the appropriate valves at each position, suitable detailed mechanical structure for the control lever assembly including the cams 92 and pilot valves 91 is disclosed in the previously identified copending application Ser. No. 801,405.

Each pilot valve 91 has an unoperated position at which an associated control line 93 is vented to atmosphere and has an operated (piloted) position at which the associated control line is connected to a pilot valve pressure line 94. Line 94 receives air under pressure from a suitable pressurized air supply 96 through an additional valve 97 which has an unpiloted position communicating the supply 96 with line 94 and which can be piloted to vent line 94 for purposes to be described.

Movement of the control lever along arc 83 to any of the fore and aft positions conditions the pilot valves for a particular shift as discussed above but does not in itself initiate the shaft. Initiation of the selected shift occurs only when the control lever 21 is moved sidewardly into one of the notches 89 of the quadrant plate 88. This movement is sensed by a shift initiating valve 98. When the control lever 21 is at one of the gear settings within a notch 89, i.e. away from arc 83, valve 98 vents an associated control line 99. When control lever 21 is moved out of any notch 89 onto arc 83, termed the select position, valve 98 is operated to communicate control line 99 with the air supply 96.

Thus movement of control lever 21 to any selected position along arc 83 acts to condition the system for pressurizing a unique combination of the control lines 93 and subsequent sideward movement of the control lever into a notch 89 acts to exhaust control line 99 to initiate a shift. As all shift determining and initiating signals are transmitted through fluid lines, the control lever 21 may be situated remotely from the transmission if desired and may be connected therewith solely by high pressure hoses.

Pilot valve 91a, through control line 93a conditions the first shift fork actuator 19a for operation as necessary at each position of the control lever. In particular, the forward end of actuator 19a is communicated with an actuator pressure supply line 100 through a power valve 101a. Power valve 101a has a piloted position at which the end of the actuator 19a is cut off from pressure supply line 100 and vented. The opposite end of actuator 19a connects with supply line 100 through another power valve 102a when the valve 102a is piloted and is vented when the valve 102a is unpiloted. Control line 93a from pilot valve 91a communicates with the pilots of both power valves 101a and 102a through a three-way check valve 103a so that both power valves are piloted when a pressure signal is received through the control line. Thus, if the control line 93a is unpressurized, the front end of actuator 19a is conditioned to receive pressure and the back end is vented. When control line 93a is pressurized, the front end of actuator 19a is vented and the back end is communicated with pressure supply line 100. The back end of actuator 19a is also communicated with the pilots of power valves 101a and 102a through the three-way check valve 103a so that the valves remain piloted if the pressure in the control line 93a is subsequently relieved while supply line 100 remains pressurized. This assures that the actuator 19a remains in position when the control lever 21 is subsequently moved to the select position at arc 83 in preparation for a subsequent shift. As previously pointed out, the actuators 19 should not operate when the control lever is moved into the select position but should operate only when the control lever is subsequently moved sidewardly to initiate the subsequent shift. Supply line 100 communicates with the air supply 96 through an additional valve 104 when the valve 104 is piloted, the supply line 100 otherwise being vented. Pilot pressure at valve 104 is relieved to vent supply line 100 and unlock the actuators 19 by movement of the control lever 21 away from the select position as will hereinafter be described in more detail.

Actuator 19d responds to pressure signals in control line 93d in an essentially similar manner. Thus, the front end of actuator 19d is communicated with supply line 100 through a power valve 101d which may be piloted to vent the front end of the actuator and the back end of the actuator 19d is communicated with line 100 through another power valve 102d when the valve 102d is unpiloted. Control line 93d connects with the pilots of valves 101d and 102d through a three-way check valve 103d and the pilots of both valves 101d and 102d are both communicated with the back end of the actuator 19d through the three-way check valve to lock the actuator in position as long as the pressure in supply line 100 is present.

Control line 93c conditions actuator 19c in an essentially similar manner except that the particular ratio gear arrangements of the present transmission require that it be the front end of actuator 19c which is vented through an associated power valve 102c except when pressure is applied by piloting of valve 102c while the back end of actuator 19c is communicated with supply line 100 through a power valve 101c in the unpiloted position of the valve. The pilots of power valves 101c and 102c are both communicated with control line 93c through a three-way check valve 103c which also connects the forward end of actuator 19c with the pilots of both valves to continue piloting thereof until supply line 100 is vented.

Actuator 19b is of a specialized form which must assume an intermediate position under reverse drive conditions in this particular transmission in addition to the extreme forward and extreme backward positions as provided in the previously described actuators 19. Actuator 19b is conditioned for the extreme positions by pilot valve 91b in a manner essentially similar to that described above. In particular, the back end of actuator 19b communicates with actuator supply line 100 through a pilot valve 101b in the unpiloted condition and is vented when the power valve 101b is piloted. The forward end of actuator 19b communicates with the supply line 100 through an additional power valve 102b when the valve 102b is piloted and is vented when the valve 102b is unpiloted. The pilots of both power valves 101b and 102b are jointly connected with control line 93b through a three-way check valve 103b, which is also communicated with the forward end of the actuator. Thus when pilot valve 91b vents control line 93b actuator 19b is conditioned to be shifted in a first direction and when the pilot valve is operated to pressurize the control line, the actuator is conditioned to shift in the opposite direction. The connection between three-way check valve 103b and the forward end of the actuator assures that the actuator is locked in position if control line 93b pressure is removed after first being applied to shift the actuator. To assure the intermediate position of actuator 19b under reverse drive conditions, air cylinders 106 are provided at each end of the actuator and have pistons 107 which extend into the opposite end of the actuator and which may be driven by air supplied through a line 108 to center the actuator. Line 108 is pressurized for this purpose when the reverse drive actuator 19e is pressurized as will hereinafter be described.

Reverse actuator 19e differs from the others in that it is provided with spring means 109 which biases the actuator towards the forward drive position and which is retracted to relieve the spring force on the actuator piston by the same air pressure which is supplied to the opposite end of the actuator to shift the reverse shift fork. Accordingly, only a single power valve 111 is required to energize the reverse actuator 19e in response to pressurizing of control line 93e from reverse pilot valve 91e. Control line 93e connects to the pilot of power valve 111 through a three-way check valve 103e which also connects to the actuator to provide the locking action when control line 93e pressure is removed. Power valve 111 vents the actuator 19e when unpiloted and upon being piloted connects actuator pressure supply line 100 thereto through an additional valve 112. The pilot of valve 112 is connected to both ends of actuator 19b through an additional three-way valve 113 to block attempted operation of the reverse actuator 19e if there is pressure present at either end of actuator 19b as attempted engagement of the reverse elements under this condition in this particular transmission could result in damage. Power valve 101b of actuator 19b is piloted to vent the associated end of actuator 19b at this time by a connection 114 from reverse actuator three-way check valve 103e to the pilot of power valve 101b through an additional three-way check valve 116. Three-way check valve 116 also connects with the pilot of power valve 102b so that valve 101b operates to vent the associated end of actuator 19b if valve 102b is piloted to pressurize the opposite end of actuator 19b.

Neutral is achieved in the present transmission by disengaging the output clutch 58. When the control lever is positioned in the neutral setting along arc 83, pilot valve 91f is operated to pressurize control line 93f which connects with the pilot of a neutral valve 117 through a three-way check valve 118. Control line 93f also connects with the pilot of valve 144 through three-way check valve 118 and the previously described three-way check valve 146. Thus pressurizing of control line 93f pilots valve 144 to vent the pilot of output clutch control valve 148 and thereby exhausts the output clutch 58. Valve 117 connects actuator pressure supply line 100 with the pilot of valve 144 through three-way check valves 118 and 146 to maintain the output clutch 58 disengaged when the signal pressure in control line 93f is relieved by movement of the control lever 21 out of neutral position along arc 83.

When the operator's control lever 21 is positioned at a selected gear setting away from arc 83, the previously described shift initiating valve 98 vents the associated control line 99. Upon movement of the control lever 21 out of a specific setting and onto arc 83 in preparation for selecting another speed ratio, shift initiating valve 98 is operated to supply pressure from supply 96 to control line 99. Pressurizing of control line 99 pilots a valve 131 to connect air supply 96 with a conduit 132 through an additional valve 133. Pressurizing of conduit 132 pilots four additional valves. In particular pressure in conduit 132 pilots valve 97 through a control line 134 causing the pressure in pilot valve pressure line 94 to be exhausted. The several actuators 19 are unaffected by this loss of control line pressure because of the presence of the previously described locking actions at three way check valves 103. Pressurizing of conduit 132 also pilots a valve 136 to exhaust a timer 137 for purposes to be hereinafter described. To avoid loss of pressure at actuators 19 at this time, pressure from conduit 132 also pilots valve 104 through a three-way check valve 138. Prior to movement of the shift lever 21 out of a particular setting, valve 104 was piloted by pressure received through valve 136 and a valve 139 through the other leg of the three-way check 138. The final effect of pressurizing conduit 132 is to continue pilot pressure to a valve 141 through three-way check valve 145 to maintain the input clutch 31 in its engaged condition, the valve 141 having been previously piloted by the pressure in delay 137.

Thus, the movement of the control lever 21 out of a specific setting and into the select position at arc 83 and any movement of the control lever along arc 83 does not in itself initiate a shift of the transmission. All actuators 19 and input and output clutches and brakes 31, 58, 42, and 75 remain in the condition which existed when the lever was at the previous speed setting. A shift of the transmission is initiated only when the control lever is again moved sidewardly from arc 83 into a selected speed setting.

Movement of the control lever 21 away from arc 83 into a selected speed setting causes shift initiating valve 98 to again exhaust the associated control line 99 and thereby exhaust the pilot of valve 131. This in turn exhausts conduit 132. Exhaustion of conduit 132, depressurizes control line 134 to remove pilot pressure from valve 97 and thereby restores pressure to the pilot valve pressure line 94. Assuming that the control lever 21 has been shifted to a new speed setting, this results in pressurizing of a different combination of control lines 93 to condition actuator power valves 101 and 102 to accomplish the desired transmission shift. However, this does not in itself cause the actuators 19 to proceed to shift inasmuch as the exhausting of conduit 132 results in depressurizing the pilot of valve 104 through check valve 138 and thereby exhausts the actuator pressure supply line 100. The exhausting of conduit 132 also acts to apply pressurized air to input clutch 31 by depressurizing the pilot of valve 141 which then communicates the input clutch with air supply 96 to cause clutch disengagement at the input section of the transmission. Depressurizing of the pilot valve 141 provides pressurized air to the pilot of a valve 142 through a valve 143 and to the pilot of another valve 144 through a three-way check valve 146 and also applies pilot pressure to valve 133. Piloting of valve 144 depressurizes the pilot of a valve 148 to disengage the output clutch 58. In the piloted position, valve 148 supplies pressure to output clutch 58 from supply 96 through a pressure regulator 149 and flow restriction 151.

The application of air pressure to valve 143 resulting from the depressurizing of the pilot valve 141 as described above pilots valve 142 to apply air pressure to input brake 42 through a flow restriction 152 and also acts to apply the output brake 75 by pressurizing the pilot of a valve 153 through a three-way check valve 154. Upon being piloted valve 153 applies pressure to the output brake 75 through a valve 156, such pressure being derived from air supply 96 through a flow restriction 157.

Accordingly after disengagement of the input and output clutches 31 and 58, pressure is applied to input and output brakes 42 and 75 respectively. For efficient operation, the application of the two brakes 42 and 75 should be modulated and coordinated to assure that the input brake 42 absorbs the load of stopping the forward portion of the change speed gearing while the output brake 75 functions to stop the rearward portion. It is highly desirable that the position of zero torque within the gearing during this braking operation should be between backlash locations to avoid possible torque locking. The necessary coordinated modulation for these purposes is provided by appropriately sizing the two flow restrictions 152 and 157.

As pointed out above, the valve 133 is also piloted by the pressure which disengages input clutch 31. By isolating conduit 132 from air supply 96, this prevents an inadvertent initiation of another shift cycle, before a prior one has been completed, by overly rapid movement of the operator's control lever 21.

Following disengagement of the input and output clutches and application of the input and output brakes, the circuit 22 reapplies air pressure to actuator pressure supply line 100. This is accomplished by a delay 158 which pressurizes the pilot of valve 139 through three-way check valves 159 and 161 with air derived through the previously described valves 141 and 143. Pressurizing of the pilot of valve 139 provides air from supply 96 to the pilot of valve 104 through valve 136 and three-way check valve 138 to accomplish the pressurizing of the actuator supply line.

The pressure thus applied to actuator supply line 100 pilots valve 143 through a delay 163. To assure a continued supply of air pressure to supply line 100, the air being transmitted through valve 136 is returned to three-way check valve 161 to hold valve 139 piloted. Accordingly, at this time when the input and output clutches are disengaged and the input and output brakes are applied, actuators 19 are energized to perform the shift fork movements necessary to accomplish the shift determined by the position of the operator's control lever 21. If a condition of tooth abutment occurs in one or more of the toothed elements of the gearing section, the shift may not be immediately accomplished but the associated actuator continues to apply pressure in a direction tending to effect the engagement of the abutted toothed elements.

In accordance with an important aspect of the invention, the input brake 42 is now released prior to release of the output brake 75 so that the member of any abutted pair of toothed elements which is coupled to the input of the transmission will be lightly rotated relative to the other member and the desired engagement will occur. The release of the input brake 42 results from the above described pressurizing of the pilot of valve 143 with air from actuator supply line 100 through delay 163. This exhausts the pilot of the input brake control valve 142 to vent the associated brake. This also exhausts delay 158. Output brake 75 remains temporarily engaged as three way check valve 154 shifts to maintain the pressure at the pilot of valve 153. After a predetermined period of time sufficient to assure engagement of any abutted tooth elements in the change speed gearing, output brake 75 is also released as the pilots of valve 141 and valve 156 are eventually pressurized through the delay 137. Piloting of the valve 156 exhausts the output brake 75. The piloting of valve 141 initiates engagement of the input and output clutches 31 and 58.

In particular, piloting of valve 141 exhausts the input clutch 31 and the pressure at the pilot of valve 133 and at the pilot of valve 144 which then pressurizes the pilot of valve 148 to reapply pressure to the output clutch 58 through pressure regulator 149 which modulates the rate of pressure rise to smoothly reestablish drive through the transmission at the new drive ratio.

In the gear system of the particular transmission herein described, the elements which are engaged by actuator 19e in particular are most prone to delayed engagement due to high relative rotations and other factors. As a safety feature valve 144 is coupled to the air supply 96 through an additional valve 166 which must be piloted to admit air to valve 144 and thus to the output clutch 58. Valve 166 is piloted for this purpose by pressure received through a three way check valve 177 coupled between the two sides of actuator 19e. Thus, the output clutch can be pressurized to reestablish drive through the transmission only after actuator 19e has completed any shift which may be necessary. It will be apparent that a similar safety feature may be associated with one or more other actuators 19 if the characteristics of a particular transmission make it advisable.

What is claimed is:

1. A drive transmission for coupling an engine to a driven load at any selected one of a plurality of drive ratios comprising:

a gear section having an input shaft and an output shaft and a plurality of change speed gears and having shift means for interconnecting said gears in any of a plurality of predetermined relationships to provide said plurality of drive ratios, an input clutch for coupling said gear section input shaft to said engine and having an engaged position and a disengaged position, an input brake operative on said gear section input shaft and having an engaged position and a disengaged position, an output clutch for coupling said driven load and said gear section output shaft and having an engaged position and a disengaged position, an output brake operative on said gear section output shaft and having an engaged position and a disengaged position, an operator's shift initiating element movable between a plurality of positions each corresponding to a separate one of said drive ratios, and shift control means initiating disengagement of said input and output clutches and engagement of said input and output brakes in response to movement of said shift initiating element to any of said positions thereof and subsequently initiating disengagement of said input and output brakes and engagement of said input and output clutches.

2. The combination defined in claim 1 wherein said shift control means delays engagement of one of said brakes relative to the other thereof following said movement of said shift initiating element into one of said positions thereof.

3. The combination defined in claim 1 wherein said shift control means includes delay means which delays disengagement of said output brake relative to disengagement of said input brake.

4. The combination defined in claim 1 wherein said shift control means responds to said movement of shift initiating element into one of said positions thereof by disengaging said clutches and engaging said brakes, operating said shift means and sequentially disengaging said front brake and then disengaging said rear brake, then engaging said front clutch, and then engaging said rear clutch.

5. The combination defined in claim 1 wherein said input brake and said output brake are fluid pressure operated and wherein said shift control means comprises an input brake valve for supplying fluid under pressure to said input brake, an output brake valve for supplying fluid under pressure to said output brake, and sequencing means responding to said movement of said shift initiating element into one of said positions thereof by operating said input brake valve and subsequently operating said output brake valve whereby said input brake is disengaged prior to disengagement of said output brake to provide for rotation of said gear section input shaft while said output shaft thereof is braked to facilitate engagement of said gears therein.

6. The combination defined in claim 1 wherein each of said clutches and brakes are controlled by fluid pressure and wherein said shift control means comprises an input clutch control valve for supplying pressurized fluid to said input clutch, an input brake control valve for supplying pressurized fluid to aid input brake, an output clutch control valve for supplying pressurized fluid to said output clutch, an output brake control valve for supplying pressurized fluid to said output brake and fluid pressure sequencing means which responds to said movement of said shift initiating element into one of said positions thereof by first operating said input clutch valve and said output clutch valve to disengage said input and output clutches and then subsequently operates said input and output brake valves to engage said input and output brakes, and then subsequently operates said shift means of said gear section, and then subsequently operates said input brake valve to disengage said input brake, and then subsequently operates said output brake valve to disengage said output brake and then subsequently operates said input clutch valve to reengage said input clutch, and then subsequently operates said output clutch valve to reengage said output clutch to restore torque transmission through said transmission.

7. The combination defined in claim 1 wherein said output clutch and said output brake are contained within an output coupler section of said transmission between said gear section and said driven load, said output coupler section comprising:
a housing, having said gear section output shaft extending therein and having a driven member extending therein in coaxial relationship to said gear section output member, a first output clutch disc disposed in said housing and being splined to said gear section output shaft for rotation therewith, a second output clutch disc disposed in said housing adjacent said first clutch disc and being splined to said driven member for rotation therewith, a pressure plate in said housing splined to said gear section output shaft for rotation therewith, said pressure plate being movable axially to compress said first clutch disc against said second clutch disc whereby said gear section output shaft is drivingly coupled to said driven member, a spring bearing against said pressure plate in a direction tending to relieve the pressure of said plate against said clutch disc, an output clutch piston in said housing movable to exert force against said pressure plate in opposition to the force of said spring thereon to cause said pressure plate to engage said clutch disc, means for directing fluid pressure to said output clutch piston for producing said movement thereof, and a braking means in said housing for exerting a clamping force on said gear section output shaft while said clutch discs are disengaged.

8. The combination defined in claim 7 wherein said braking means comprises a first brake disc splined to said gear section output shaft for rotation therewith and being movable axially relative thereto, a second brake disc disposed adjacent said first brake disc and being fixed against rotation relative to said housing, and an output brake piston disposed in said housing and being movable to force said first brake disc against said second brake disc, and means for applying fluid pressure to said second piston for selectively causing said output brake piston to engage said brake discs.

9. An output coupler mechanism for a drive transmission having change speed gearing comprising:
a housing,
rotatable drive means extending into said housing for transmitting drive from said change speed gearing,
rotatable driven means extending out of said housing,
a first clutch disc disposed in said housing and being splined to said drive means for rotation therewith,
a second clutch disc disposed in said housing adjacent said first clutch disc and being splined to said driven means for rotation therewith,
a pressure plate in said housing splined to said drive means for rotation therewith, said pressure plate being movable axially to compress said first clutch disc against said second clutch disc whereby said drive means is drivingly coupled to said driven means,
a spring bearing against said pressure plate in a direction tending to relieve the pressure of said plate against said clutch disc,
a clutch piston in said housing movable to exert a force against said pressure plate in opposition to the force of said spring thereon to cause said pressure plate to engage said clutch discs,
means for selectively and controllably applying fluid pressure to said clutch piston for producing said movement thereof, and
means for braking said drive member while said clutch discs are disengaged whereby said change speed gearing is stopped to facilitate shifting thereof.

10. The combination defined in claim 9 wherein said drive means and driven means and said clutch discs and said pressure plate and said clutch piston are coaxial annular elements and further comprising means for constraining said clutch piston against rotation and bearing means disposed between said clutch piston and said pressure plate for transmitting axial movement of said clutch piston to said pressure plate.

11. The combination defined in claim 10 wherein said driven means comprises an output shaft and an output member splined thereto, and a tapered roller thrust bearing disposed coaxially between said output member and said stationary housing whereby the force of said clutch piston against said pressure plate and said clutch disc is sustained by said bearing rather than said output shaft.

12. The combination defined in claim 9 wherein said means for braking said drive means comprises a first brake disc splined to said drive means for rotation therewith and being movable axially relative thereto, a second brake disc disposed adjacent said first brake disc and being fixed against rotation relative to said housing, a brake piston disposed in said housing and being movable to compress said first brake disc against said second brake disc, and means for applying fluid pressure to said brake piston for selectively causing said piston to compress said brake discs.

* * * * *